No. 798,162. PATENTED AUG. 29, 1905.
E. R. CARICHOFF.
CONTROL SYSTEM.
APPLICATION FILED JUNE 30, 1904.
2 SHEETS—SHEET 1.
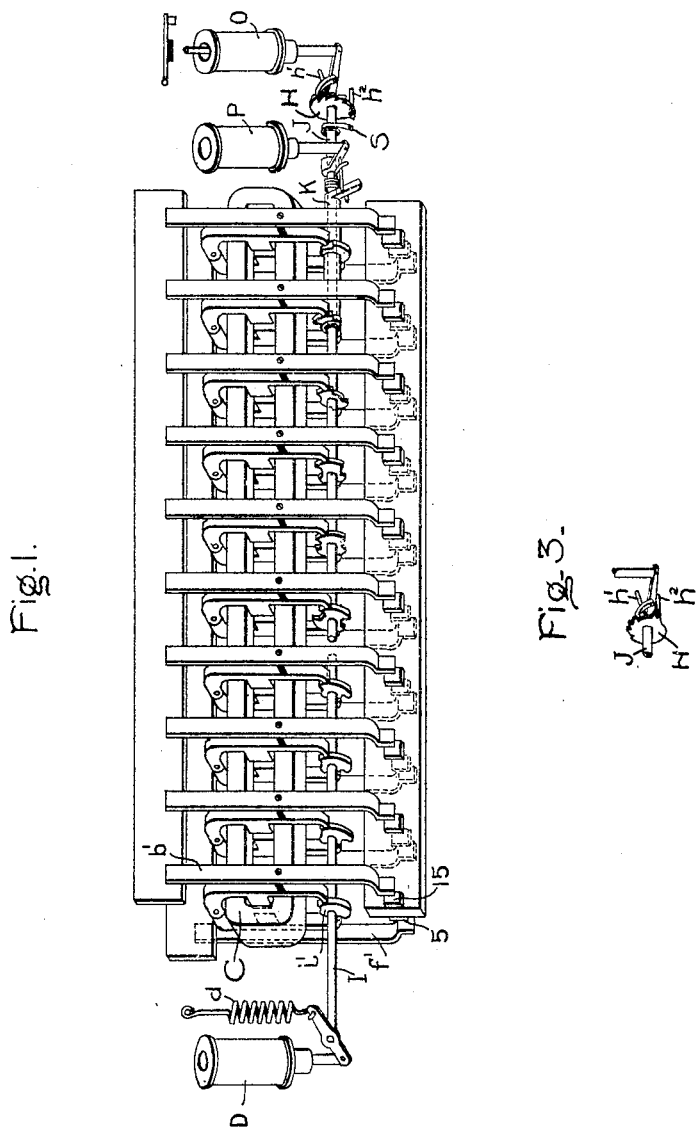
Witnesses.
Inventor:
Eugene R. Carichoff.
by
Atty.

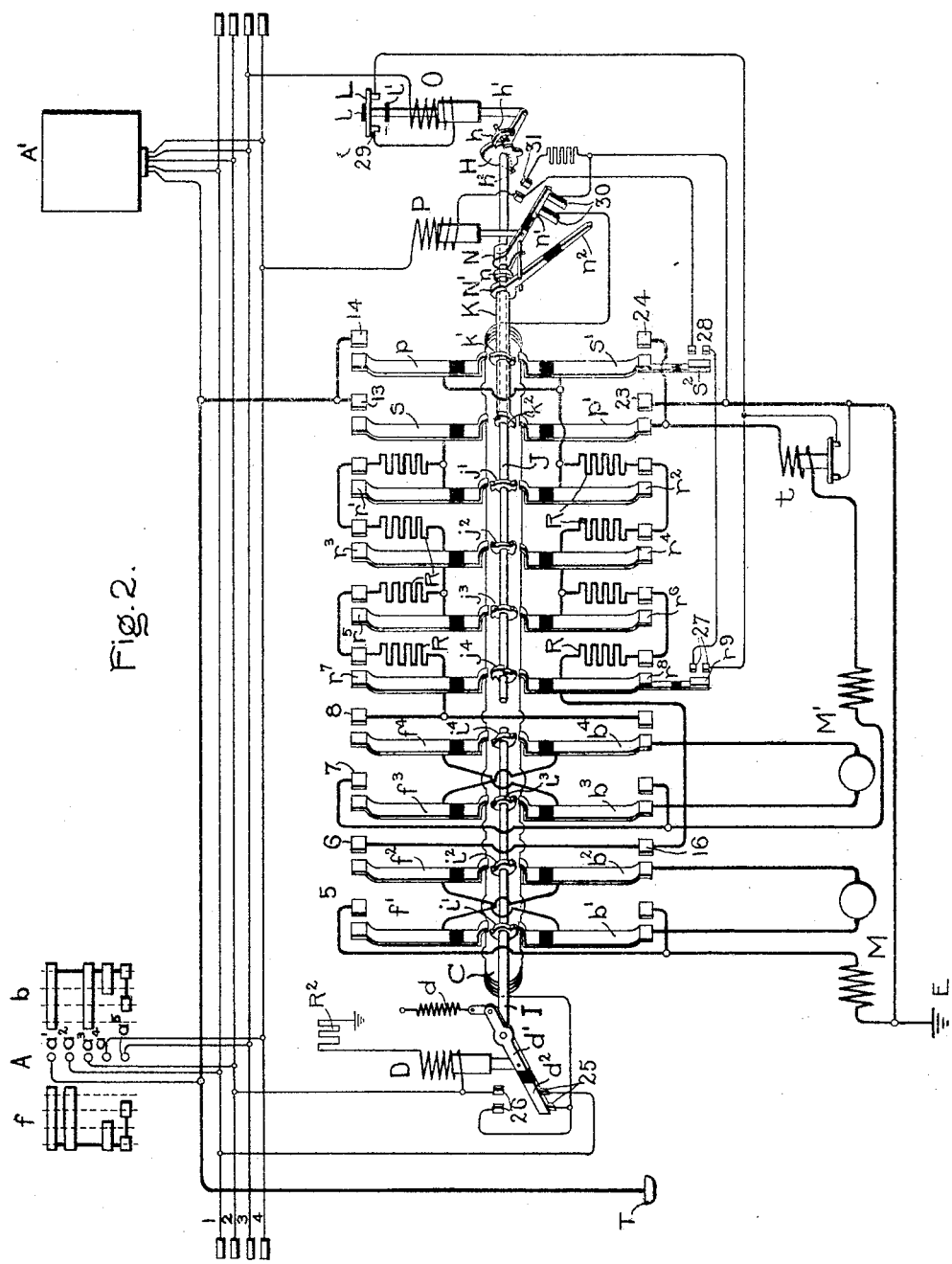

UNITED STATES PATENT OFFICE.

EUGENE R. CARICHOFF, OF EAST ORANGE, NEW JERSEY, ASSIGNOR TO GENERAL ELECTRIC COMPANY, A CORPORATION OF NEW YORK.

CONTROL SYSTEM.

No. 798,162.         Specification of Letters Patent.         Patented Aug. 29, 1905.

Application filed June 30, 1904. Serial No. 214,696.

*To all whom it may concern:*

Be it known that I, EUGENE R. CARICHOFF, a citizen of the United States, residing at East Orange, county of Essex, State of New Jersey, have invented certain new and useful Improvements in Control Systems, of which the following is a specification.

My invention relates to systems of control for electric translating devices, and is particularly adapted for use for controlling motors on electrically-propelled vehicles.

In an application for Letters Patent, Serial No. 179,796, filed by me November 4, 1903, I disclosed a system of control embodying as one of its features a controller arranged to connect and combine in any predetermined order the translating devices to be controlled in such manner that all possibility of injury to the translating devices due to a too rapid increase of current is eliminated. I showed my invention as applied to an automatically-accelerating motor-control system. The automatic controlling-switch disclosed consists of a plurality of normally open switches with means for placing them simultaneously under strain, tending to cause them to close, together with means for obstructing the closing of certain switches and means for serially removing the obstructing devices, so as to permit the closing of the switches in a predetermined order. The particular arrangement for obtaining this end described in my former application consists in a plurality of switches flexibly mounted on a shaft, with means for rotating the shaft, so as to place the switches under strain. In a second application, Serial No. 214,694, filed June 30, 1904, I disclosed an improved form of controlling-switch adapted for use in the arrangement of my former application, in which a plurality of normally open switches are simultaneously placed under strain by a single magnet-winding, the magnet-winding being provided with a plurality of armatures operatively connected to the several switches.

My present invention in one aspect consists in a novel arrangement of the magnet-winding switches and obstructing devices whereby a compact and efficient switch is produced.

In another aspect my invention consists in the combination, with a plurality of motors and resistances therefor, of a plurality of normally open switches adapted and arranged to connect the motors in series and in parallel, to vary the amount of resistance included in the motor-circuits, and to connect the motors for forward and reverse rotation, together with a single magnet-winding arranged to place all the switches under strain, with selective controlling means whereby the switches are permitted to close in a predetermined order.

More specifically considered, my invention consists in the combination, with a plurality of motors and resistances therefor, of a main magnet-winding, three sets of switches arranged to be placed simultaneously under strain by the magnet-winding, one set of switches being arranged for connecting the motors for forward or reverse rotation, a second set for connecting them in series or in parallel, and a third set for controlling the amount of resistance in the motor-circuits, independent sets of obstructing devices for the several sets of switches, independent controlling means for the several sets of obstructing devices, and a master control-switch whereby all the desired connections of the motor-circuit may be obtained.

In another aspect my invention consists in a multiple-unit train-control system in which each unit comprises the several switches for making the desired connections in the motor-circuits, a single actuating-coil for all of the switches, and selective devices governing the action of the actuating-coil, and a master-controller governing the main actuating-coils and selective devices of all the units.

My invention will best be understood by reference to the accompanying drawings, in which—

Figure 1 shows a motor-controller arranged in accordance with my invention. Fig. 2 shows diagrammatically my invention applied to a multiple-unit train-control system, and Fig. 3 shows a detail of the controller.

In the drawings, C represents the main actuating-coil of the motor-controller. This coil is provided with a plurality of armatures controlling three sets of switches, which are connected in circuit with the motors M M'. One set of switches comprises eight fingers, (indicated by $f'$ to $f^4$ and $b'$ to $b^4$.) This set is adapted and arranged to connect the motors for forward and backward rotation. A second set consists of four switches $s\ s'$ and $p\ p'$. These switches are adapted and arranged for connecting the motors in series or in parallel.

A third set comprises eight switches $r'$ to $r^8$. These switches control the amount of resistance R in the motor-circuit. All these switches are normally held in open position either by their weight, elasticity, or any suitable retracting means. When the main actuating-coil C is energized, all these switches are placed under strain, tending to close them; but certain of the switches of each set are prevented from closing by the obstructing devices for that set. The obstructing devices for the first set of switches for forward and reverse rotation consist of the four cams $i''$ to $i^4$, mounted on the shaft I and controlled by the magnet-winding D. This magnet-winding consequently controls the direction of rotation of the motors. The third set of switches $r'$ to $r^8$ for controlling the amount of resistance in the motor-circuits is obstructed by the cams $j''$ to $j^4$, mounted on the shaft J, which is controlled by the magnet-winding O. This magnet-winding consequently controls the amount of resistance in the motor-circuits. The second set of switches $s\ s'$ and $p\ p'$ is obstructed by the two cams $k'$ and $k^2$, carried by sleeve K, mounted on shaft J. The sleeve K is controlled, as will be hereinafter described, by the coil P. This coil consequently controls the series and parallel connections of the motors. The coils D, P, and O are connected to the train-wires 1, 2, 3, and 4. These are shown in Fig. 2 provided with couplings at either end, it being understood that Fig. 2 shows the arrangement for a single unit of the system, the arrangement being duplicated for each car of the train.

A A' represent two master-controllers, the controller A being shown with the contacts developed on a plane surface. Two sets of movable contacts are shown for forward and reverse rotation, (indicated by the letters $f$ and $b$.) The master-controller is shown with four positions each for forward and backward rotation. (Indicated by the four dotted lines for each set of movable contacts.) The motor-circuits are indicated in heavy lines and receive their current from the trolley T or other suitable source of current. The control-circuits are shown in light lines and include the master-controller, the main actuating-coil C, the auxiliary controlling devices D, P, and O, and the train-wires.

Considering the arrangement of the auxiliary controlling devices more specifically, it will be seen that the core of coil D, which controls the direction of rotation and which will be hereinafter called the "director-coil," is connected to the shaft I through the lever $d'$. A tension-spring $d$ is connected to the lever $d'$ and holds shaft I in the position shown as long as director-coil D is not energized. This position of the shaft and its obstructing devices corresponds to the forward direction of rotation, as will be hereinafter seen. The lever $d'$ carries the bridging member $d^2$ arranged to engage the contacts 25 and 26, according to its position. These contacts form an interlock between the director-coil D and the main actuating-coil C, as will be hereinafter explained.

The movement of the shaft J is controlled by the coil O by means of a toothed wheel H, mounted on the shaft, and the pawl $h$, actuated by the core of coil O. The pawl $h$ is provided with a pin $h'$, which lifts the pawl $h$ out of engagement with the toothed wheel when coil O is deënergized and the core falls to the position shown. The core of coil O also carries two insulating-collars $l$ and $l'$, which engage the bridging member L when the core of coil O is raised and lowered. The bridging member L, which is in engagement with contacts 29 when the coil O is deënergized, is lifted out of engagement with these contacts by the collar $l'$ when coil O is energized to lift its core. This raising of the bridging member L opens the circuit of coil O at contacts 29 and results in a deënergizing of coil O, allowing its core to fall so as to bring collar $l$ into engagement with bridging member L to restore the bridging member L into engagement with the contacts 29. The circuit of coil O is thus made and broken so as to produce a reciprocating movement of its core, which results in a notching-up of shaft J by means of the toothed wheel H and the pawl $h$. Shaft J is thus rotated step by step, with the results that will be hereinafter described. Coil O, which accomplishes this movement by repeated notchings-up, will be hereinafter designated as the "repeater-coil."

The core of the coil P is connected to the lever N, which is connected to the lever N', secured to the sleeve K by means of the spiral tension-spring $n$. The lever N carries the bridging member $n'$, which engages contacts 30 or 31, according to the position of lever N. The lever N' carries the bridging member $n^2$, which engages the contacts 30 when the sleeve K is rotated.

$t$ represents a throttle connected in series with the motors and arranged to break the circuit of the repeater-coil O and to prevent further removal of resistance from the motor-circuit whenever the current in the motor-circuit reaches a predetermined amount.

The operation is, then, as follows: When master-controller A is moved to its first position for forward rotation, the following circuit is completed: from trolley T to motor-controller contact $a'$, to contact $a^2$, to train-wire 1, through bridging member $d^2$ and contacts 25, to main actuating-coil C, to contacts 30, bridging member $n'$, to earth E. A circuit is thus completed through main actuating-coil C, which places a strain upon all the switches, tending to move them to closed position. By noting the position of the several obstructing devices it will be seen that the following switches are permitted to close:

switches $f'$ to $f^4$ and switches $s$ and $s'$. The motor-circuit is then completed as follows: from trolley T to contact 13, switch $s$, through all the upper resistance-sections R, to contact 8, to switch $f^4$, to switch $b^3$, to armature of motor M', to switch $b^4$, to switch $f^3$, contact 7, field of motor M', throttle $t$, contact 24, switch $s'$, through all the lower resistance-sections R in series, to contact 16, contact 6, switch $f^2$, switch $b'$, armature of motor M, switch $b^2$, switch $f'$, contact 5, field of motor M, to earth. The two motors are thus placed in series with all the resistances in circuit. These connections continue as long as the master-controller is maintained in its first position. When the master-controller is moved to its second forward position, another circuit is completed, as follows: from trolley T to contact $a'$ of the master-controller, to contact $a^5$, to train-wire 3, through the repeater-coil O, through contacts 29 and bridging member L, through the contacts of throttle $t$, to earth. The repeater-coil is thus energized and begins the notching-up of shaft J in the manner that has been heretofore explained. The first step results in removing the obstructing device $j'$ from switches $r'$ and $r^2$. These switches are thus allowed to close, short-circuiting one section of the upper and lower resistance-sections R, respectively. The second step results in the closing of switches $r^3$ and $r^4$ and the cutting out of two more resistance-sections. This continues until all the resistance-sections are cut out. If the removal of resistance occurs too fast, the throttle $t$ will open the circuit of repeater-coil O and prevent further removal of resistance until the current in the motor-circuit falls below the predetermined value. When the last switches $r^7$ and $r^8$ are closed, all the resistances are cut out and the motors are in full-series position. When this position is reached, a pin $h^2$, carried by toothed wheel H, engages the lower side of the pivoted arm which carries pawl $h$ and prevents the core of coil O from falling. Switch member L is thus held open, and consequently further rotation of shaft J is prevented. Fig. 3 shows pin $h^2$ in position for supporting the arm which carries pawl $h'$. The shaft J is held in this position by the engagement of the switches with the obstructing devices. The above circuit connections continue as long as the master-controller is in the second position. When master-controller A is moved to its third forward position, the circuit of repeater-coil O is broken at the contact $a^5$ on the controller and another circuit is established, as follows: from trolley T to contact $a'$ of the master-controller, contact $a^4$, to train-wire 4, through the parallelor-coil P, through contacts 28 and bridging member $s^2$, through contacts 27 and bridging member $r^9$, through the contacts controlled by throttle $t$, to earth.

The circuit of the parallelor-coil P is thus closed and bridging member $n'$ is moved into engagement with contacts 31, closing a maintaining-circuit for the parallelor-coil. This operation cannot occur, however, unless switches $s'$ and $r^8$ are both closed, bringing the bridging members $s^2$ and $r^9$, respectively, into engagement with their contacts. In other words, the parallelor-coil cannot be energized except when the motors are connected in full-series position. Although the arm N has been raised by the core of parallelor-coil P, the arm N' is not free to follow, since the obstructing devices $k'$ and $k^2$ are engaged by the switches $s'$ and $s$, respectively. The tension-spring $n$ is thus put under strain. The movement of bridging member $n'$, however, into engagement with contacts 31 results in breaking the circuit of the main actuating-coil at contact 30, thereby releasing all the switches and allowing them to return to their open positions. This movement of the switches results in releasing sleeve K from switches $s$ and $s'$, allowing the arm N' to move upward under the tension of spring $n$, so as to bring the bridging member $n^2$ into engagement with contacts 30. The obstructing devices on shaft J are also released from the resistance-controlling switches, and shaft J is allowed to return to its off position, as shown in Fig. 2, by means of the spring S. (Shown in Fig. 1.) The motor-circuits are also momentarily opened. As soon as the switches are opened, however, and sleeve K is released the circuit of main actuating-coil C is again closed by bridging member $n^2$ and contacts 30. All the switches are again placed under strain, as before, and switches $f'$ to $f^4$ close again, as before. Switch $s'$, however, is prevented from closing by the obstructing device $k'$, while, on the other hand, switches $p$ and $p'$ are free to close. The motor-circuits are then completed as follows: from trolley T to contacts 13 and 14. Here the current divides, part passing through switch $s$, upper resistance-sections R, contact 8, switch $f^4$, switch $b^3$, armature of motor M', switch $b^4$, switch $f^3$, contact 7, field of motor M', throttle-coil $t$, switch $p'$, contact 23 to earth. The other portion passes from contact 14 to switch $p$, through the lower resistance-sections R to contact 16, to contact 6, switch $f^2$, switch $b'$, armature of motor M, switch $b^2$, switch $f'$, contact 5, field of motor M to earth. The two motors are thus connected in parallel with half the resistance-sections in series with each motor. This connection continues as long as the master controller-switch is maintained in its third position. When the master-controller is moved to its fourth forward position, the circuit of the repeater-coil O is again closed, shaft J is rotated step by step, and the resistance-sections are cut out gradually in the manner heretofore explained. Finally, when the last resistance-sections are cut out the motors are connected in full parallel position, and switch L is again held open by pin $h^2$.

The connections for reverse rotation differ from those for forward rotation only in the closing of switches $b'$ to $b^4$ instead of switches $f'$ to $f^4$. This is accomplished as follows: When the master controller-switch is moved to its first backward position, a circuit is closed from trolley T, contact $a'$, contact $a^3$, train-wire 2, director-coil D, resistance $R^2$ to earth. The core of director-coil D is consequently drawn up, straining the tension-spring $d$ and rotating shaft I, so as to remove the obstructing devices $i'$ to $i^4$ out of the way of switches $b'$ to $b^4$ and placing them in the way of switches $f'$ to $f^4$. This movement of the core of director-coil D brings bridging member $d^2$ into engagement with contacts 26, thereby shifting the connection of coil C from train-wire 1 to train-wire 2. It is only by this change of connection that coil C can be energized with the master-controller in the reverse position, and this change in connections cannot be made unless switches $f'$ to $f^4$ are open, and consequently out of engagement with cams $i'$ to $i^4$. The opening of these switches means that the motor-circuits are open. In this manner an interlock is provided between the reversing-switches and the resistance-controlling and series-parallel switches. As soon as core D reaches its raised position the circuit of main actuating-coil C is again closed by means of bridging member $d^2$ and contacts 26. As the master-controller is moved through its other reverse positions the same changes are produced in the motor-circuits as has been heretofore described.

If at any time while repeater-coil O is at work cutting out resistance it is desired to stop this operation, it can be done simply by moving the master-controller from position 2 to position 1 or from position 4 to position 3. This opens the circuit of the repeater-coil and prevents further removal of resistance without interrupting the motor-circuits.

It will thus be seen that by my invention I have provided an efficient controlling system embodying a compact controller so arranged that the desired changes in the control-circuit may be made in predetermined order and in such manner that the translating device in the controller-circuit can never be overloaded by a too rapid increase of current.

Many modifications may be made in the construction and arrangement of parts without departing from the spirit of my invention, and I aim in the appended claims to cover all such modifications.

What I claim as new, and desire to secure by Letters Patent of the United States, is—

1. In combination, a plurality of switches, a magnet-winding, a plurality of armatures on each side of said magnet-winding adapted to be placed under strain when said winding is energized, obstructing devices positioned between said armatures, means for controlling said obstructing devices to permit the armatures to move in a predetermined order, and operative connections between the armatures and the several switches.

2. In combination, a plurality of switches, a magnet-winding, a plurality of armatures on each side of said winding adapted to be placed under strain when said winding is energized, a shaft positioned between said armatures, cams carried by said shaft and arranged to obstruct the movement of a portion of said armatures, means for rotating said shaft, and operative connections between the armatures and the several switches.

3. In combination, a plurality of switches, a magnet-winding, a plurality of armatures on each side of said winding, operative connections between each of said armatures and one of said switches, and means for controlling the movement of said armatures.

4. In combination, a plurality of switches, a magnet-winding, a plurality of armatures on each side of said winding, operative connections between each of said armatures and one of said switches, and means for selectively obstructing the movement of said armatures.

5. In combination with a plurality of motors, a set of normally open switches adapted to connect the motors for forward and reverse rotation, a second set adapted to connect the motors in series and in parallel, a third set for controlling the amount of resistance in the motor-circuits, means for placing all said switches simultaneously under strain tending to cause them to close, and means for selectively controlling the closing of said switches.

6. In combination with a plurality of motors, a set of normally open switches adapted to connect the motors for forward and reverse rotation, a second set adapted to connect the motors in series and in parallel, a third set for controlling the amount of resistance in the motor-circuits, a magnet-winding, a plurality of armatures therefor operatively connected to said switches and adapted to be placed under strain when said winding is energized, obstructing devices for each set of switches adapted to prevent the closing of a portion thereof, and auxiliary magnet-windings controlling said devices.

7. In combination with a plurality of motors, a set of normally open switches adapted to connect the motors for forward and reverse rotation, a second set adapted to connect the motors in series and in parallel, a magnet-winding, a plurality of armatures therefor operatively connected to said switches and adapted to be placed under strain when said winding is energized, and means for selectively controlling the movement of said armatures to close said switches.

8. In combination with a plurality of motors, a set of normally open switches adapted to connect the motors for forward and reverse rotation, a second set adapted to vary the resistance in the motor-circuits, a magnet-winding, a plurality of armatures therefor operatively connected to said switches and adapted to be placed under strain when said winding is energized, and means for selectively controlling the movement of said armatures to close said switches.

9. In combination with a plurality of motors, a set of normally open switches adapted to connect the motors in series and in parallel, a second set adapted to vary the resistance in the motor-circuits, a magnet-winding, a plurality of armatures therefor operatively connected to said switches and adapted to be placed under strain when said winding is energized, and means for selectively controlling the movement of said armatures to close said switches.

10. In combination, a magnet-winding, a plurality of armatures on each side of said winding, a plurality of switches, operative connections between each armature and one of said switches, and electroresponsive means for selectively controlling the movement of said armatures to move said switches.

11. In combination, two sets of switches, a magnet-armature carried by each switch, a magnet-winding positioned between said sets and adapted when energized to place all said armatures under strain tending to move the switches, and means for selectively controlling the movement of said switches.

12. In a train-control system, a plurality of motors, reversing-switches, series-parallel switches, resistance-controlling switches, all of said switches being normally open, means for placing all of said switches simultaneously under strain tending to close them, means for selectively controlling the closing of said switches, and a master controlling-switch controlling both said strain-producing and said selectively-controlling means.

13. In a train-control system, a plurality of motors, reversing-switches, series-parallel switches, resistance-controlling switches, all of said switches being normally open, a main actuating magnet-winding adapted to place all of said switches simultaneously under strain tending to close them, selective obstructing devices for said switches, auxiliary magnet-windings controlling said obstructing devices, and a master controlling-switch controlling the circuits of said main and auxiliary windings.

14. In combination with a motor, a reversing-switch comprising a plurality of normally open switches, means for placing said switches simultaneously under strain tending to cause them to close, and means for selectively obstructing the closing of said switches.

15. In combination with a motor, a reversing-switch comprising a plurality of normally open switches, a magnet-winding, a plurality of armatures therefor adapted to be placed under strain when said winding is energized, operative connections between said armatures and said switches, and means for selectively obstructing the closing of said switches.

16. In a system of control, a plurality of translating devices, a series-parallel device comprising a plurality of normally open switches, a magnet-winding, a plurality of armatures therefor adapted to be placed under strain when said winding is energized, operative connections between said armatures and said switches, and means for selectively obstructing the closing of said switches.

17. In a system of train control, a plurality of motors, a plurality of normally open circuit-controlling switches therefor, a magnet-winding, a plurality of armatures therefor adapted to be placed under strain when said winding is energized, operative connections between said armatures and said switches, means controllable from a distance for energizing said magnet-windings, and means controllable from a distance for selectively obstructing the closing of said switches.

18. In combination, a magnet-winding, a pawl actuated thereby, a toothed member adapted to be moved step by step by said pawl, and means carried by said member for holding said pawl inoperative when said member reaches a given position.

19. In combination, a magnet-winding, a core adapted to be raised when said magnet-winding is energized, a switch operatively connected to said core and arranged to open the circuit of said winding when said core is raised, a pawl operatively connected to said core, a toothed member adapted to be moved step by step by said pawl, and means carried by said member for holding said core in its raised position when said member reaches a given position.

In witness whereof I have hereunto set my hand this 28th day of June, 1904.

EUGENE R. CARICHOFF.

Witnesses:
E. S. MORGAN,
L. C. FOSS.